(12) United States Patent
Torsner et al.

(10) Patent No.: US 9,729,278 B2
(45) Date of Patent: Aug. 8, 2017

(54) METHOD AND A DEVICE FOR IMPROVED STATUS REPORTS

(71) Applicant: TELEFONAKTIEBOLAGET L M ERICSSON (PUBL), Stockholm (SE)

(72) Inventors: Johan Torsner, Kyrkslätt (FI); Michael Meyer, Aachen (DE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/614,159

(22) Filed: Feb. 4, 2015

(65) Prior Publication Data

US 2015/0155977 A1 Jun. 4, 2015

Related U.S. Application Data

(63) Continuation of application No. 13/269,338, filed on Oct. 7, 2011, now Pat. No. 8,982,870, which is a
(Continued)

(51) Int. Cl.
*H04W 40/00* (2009.01)
*H04L 1/16* (2006.01)
(Continued)

(52) U.S. Cl.
CPC ............ *H04L 1/1671* (2013.01); *H04L 1/165* (2013.01); *H04L 1/1621* (2013.01); *H04L 5/0055* (2013.01); *H04W 72/0406* (2013.01)

(58) Field of Classification Search
CPC ... H04W 40/00; H04W 84/18; H04W 40/246; H04W 40/30
See application file for complete search history.

(56) References Cited

U.S. PATENT DOCUMENTS 5,477,550 A * 12/1995 Crisler .................. H04L 1/1809
714/748
5,581,804 A * 12/1996 Cameron ............... H04H 20/67
455/456.1
(Continued)

FOREIGN PATENT DOCUMENTS

EP 1601127 A2 11/2005
EP 2108223 B1 9/2015
(Continued)

OTHER PUBLICATIONS

Texas Instruments Inc., R2-074023, "RLC Control Packet Structure," 3GPP TSG RAN WG2 Meeting #59bis, Oct. 8, 2007.
(Continued)

*Primary Examiner* — Fan Ng

(57) ABSTRACT

A method for use in a cellular communications system in which system traffic can be exchanged between transceivers comprises receiving traffic from a second transceiver at a first transceiver. The traffic includes data units that are each associated with an identifier. The data units are also divided into segments. The method additionally includes sending status information from the first transceiver to the second transceiver. The status information pertains to one or more data units transmitted by the second transceiver. Additionally, sending the status information includes, for non-received and partially received data units, sending information indicating the data units were non-received or partially received and, for partially received data units, sending information indicating which parts of the data units were not received.

32 Claims, 8 Drawing Sheets

Related U.S. Application Data continuation of application No. 12/524,891, filed as application No. PCT/SE2008/050108 on Jan. 28, 2008, now Pat. No. 8,036,150.

(60) Provisional application No. 60/983,633, filed on Oct. 30, 2007.

(51) Int. Cl.
*H04L 5/00* (2006.01)
*H04W 72/04* (2009.01)

(56) References Cited

U.S. PATENT DOCUMENTS

| | | | | |
|---|---|---|---|---|
| 5,634,198 | A * | 5/1997 | Cameron | H04H 20/67 370/312 |
| 6,359,871 | B1 | 3/2002 | Chung | |
| 7,751,441 | B2 | 7/2010 | Beckmann et al. | |
| 8,036,150 | B2 * | 10/2011 | Meyer | H04L 1/1621 370/310 |
| 8,155,053 | B2 | 4/2012 | Wang et al. | |
| 8,179,812 | B2 | 5/2012 | Vedantham et al. | |
| 8,261,150 | B2 * | 9/2012 | Murakami | H04B 7/0413 375/267 |
| 2003/0195016 | A1 | 10/2003 | Periyalwara | |
| 2003/0214930 | A1 | 11/2003 | Fischer | |
| 2005/0050427 | A1 * | 3/2005 | Jeong | H03M 13/2957 714/755 |
| 2005/0251721 | A1 * | 11/2005 | Ramesh | H04L 1/0068 714/748 |
| 2005/0265297 | A1 * | 12/2005 | Nakajima | H04L 1/1887 370/338 |
| 2007/0047486 | A1 * | 3/2007 | Lee | H04W 74/002 370/329 |
| 2007/0091810 | A1 * | 4/2007 | Kim | H04L 1/1635 370/236 |
| 2007/0116094 | A1 | 5/2007 | Parts | |
| 2012/0026945 | A1 * | 2/2012 | Meyer | H04L 1/1621 370/328 |

FOREIGN PATENT DOCUMENTS

| | | |
|---|---|---|
| WO | WO 9633586 A1 | 10/1996 |
| WO | 2006/058502 A1 | 6/2006 |
| WO | 2008/024282 A2 | 2/2008 |

OTHER PUBLICATIONS

Panasonic, R2-070095, "RLC PDU format for LTE," 3GPP TSG RAN WG2 Meeting #56bis, Jan. 15, 2007.
Huawei, R2-073970, "RLC status PDU type and format," 3GPP TSG RAN WG2 Meeting #59bis, Oct. 8, 2007.
Samsung, R2-070131, "PDCP/RLC/MAC header format," 3GPP TSG RAN WG2 Meeting #56bis, Jan. 15, 2007.
Ericsson, R2-070062, "RLC-MAC Header Formats," 3GPP TSG RAN WG2 Meeting #56bis, Jan. 15, 2007.
Alcatel-Lucent, R2-070106, "RLC PDU structure in LTE," 3GPP TSG RAN WG2 Meeting #56bis, Jan. 15, 2007.
3GPP, "TS 25.322 V7.0.0, Radio Link Control (RLC) protocol specification (Release 7)," Mar. 2006.
Samsung, R2-063118, "Lite RLC vs. Normal RLC," 3GPP TSG RAN WG2 Meeting #56, Nov. 6, 2006.
NTT DoCoMo Inc., R2-070282, "RLC PDUs for LTE," 3GPP TSG RAN WG2 Meeting #56bis, Jan. 15, 2007.
Nokia Corporation / Nokia Siemens Networks, R2-073901, "Combined RLC ARQ text proposals," 3GPP TSG RAN WG2 Meeting #59bis, Oct. 8, 2007.
Motorola, R2-074397, "RLC Status Report SUFI for PDU segments," 3GPP TSG RAN WG2 Meeting #59bis, Oct. 8, 2007.
Motorola, R2-073539, "RLC Status Report SUFIs for PDU/PDU segments ACK/NACK," 3GPP TSG RAN WG2 Meeting #59, Aug. 20, 2007.
Texas Instruments Inc., R2-074022, "On RLC Header Format," 3GPP TSG RAN WG2 Meeting #59bis, Oct. 8, 2007.
Samsung, R2-074267, "Issues on the status reporting," 3GPP TSG RAN WG2 Meeting #59bis, Oct. 8, 2007.
Huawei: "RLC status PDU type and format". 3GPP Draft: R2-073174. Athens, Greece. Aug. 20-24, 2007.
3rd Generation Partnership Project; "RLC PDU Format for LTE," 3GPP TSG RAN WG2#56bis, R2-070095, Jan. 15-19, 2007, Sorrento, Italy.
3rd Generation Partnership Project; "RLC Status Report Format," 3GPP TSG RAN WG2 Meeting #60, Tdoc R2-074701, Nov. 5-9, 2007, Jeju Island, Korea.
3rd Generation Partnership Project; "RLC Status Report SUFI for PDU Segments," 3GPP TSG RAN WG2, R2-074397, Oct. 8-12, 2007, Shanghai, China.
USDC Northern District of California Defendants' Opening Claim Construction Brief Case No. 3:15-cv-00154-JD.
USDC Northern District of California Declaration of Dr. Ray W. Nettleton in Support of Defendants' Opening Claim Construction Brief Case No. 3:15-cv-00154-JD.
USDC Northern District of California Apple Inc's Responsive Claim Construction Brief Case No. 3:15-cv-00154-JD.
USDC Northern District of California Declaration of Sundeep Rangan, Phd. In Support of Apple's Claim Construction Brief Case No. 3:15-cv-00154-JD.
USDC Northern District of California Defendants' Reply Claim Construction Brief Case No. 3:15-cv-00154-JD.
USDC Northern District of California Supplemental Declaration of Dr. Ray W. Nettleton in Support of Defendants' Reply Claim Construction Brief.

* cited by examiner

300

| D/C | PDU type | ACK_SN | |
|---|---|---|---|
| | E | NACK1_SN | |
| | | E | F |
| NACK2_SN | | | |
| E | F | NACK3_SN | |
| | | E | F |
| SO11 | | | |
| SO12 | | | |
| SO21 | | | |
| SO22 | | | |
| ......... | | | |
| ......... | | | |
| | PAD | | |

Fig 3

| F | Meaning | No. of SOs |
|---|---|---|
| 00 | NACK, RLC PDU | 0 |
| 01 | NACK, first part of RLC PDU. | 1 |
| 10 | NACK, last part of RLC PDU. | 1 |
| 11 | NACK, middle part of RLC PDU. | 2 |

Fig 4

| SN | RF | E |
|----|----|----|
| 1  | 1  | 1 |
| 2  | 1  | 1 |
| 3  | 1  | 1 |
| 3  | 1  | 0 |
| 1  | 16 |   |
| 24 | 36 |   |
| 1  | 23 |   |
| 47 | 42 |   |
| SO | LF |   |

Fig 6

METHOD AND A DEVICE FOR IMPROVED STATUS REPORTS

CROSS REFERENCE TO RELATED APPLICATIONS

This patent application is a continuation of U.S. patent application Ser. No. 13/269,338 filed on Oct. 7, 2011 which is a continuation of U.S. patent application Ser. No. 12/524,891 filed on Jul. 29, 2009, which is the U.S. national stage entry of PCT/SE2008/050108, filed Jan. 28, 2008, which claims the benefit of U.S. Provisional Application No. 60/983,633, filed Oct. 30, 2007 and PCT/EP2007/050994 filed on Feb. 1, 2007, the disclosures of which are all fully incorporated herein by reference.

TECHNICAL FIELD

The present invention discloses a method for use in a cellular communications system, in which system traffic can be exchanged between a first and a second transceiver. The traffic is sent in data units, each of which is given an identifier and which may be divided into segments. A receiving transceiver may send status information in data frames or data units about transmitted data units to a transmitting transceiver, i.e. to the transceiver from which the data was transmitted.

BACKGROUND

In the 3GPP LTE project (3rd generation Partnership Project, Long Term Evolution) for cellular communication systems, an RLC (Radio Link Control) protocol is used for communication between users in a cell and the controlling node of the cell, i.e. the so called eNodeB, "evolved NodeB".

In the RLC, traffic is sent as so called PDUs, i.e. Protocol Data Units, which are identified by being given sequence numbers. In response to PDUs from a transmitting party, the receiving party sends so called RLC status PDUs to the transmitting party, with so called ACKs and/or NACKS, i.e. acknowledgements (ACK) that data has been properly received, or information (NACK) that data has not been properly received, i.e. received only partly or not at all. The ACKs and NACKS in the RLC status PDUs are sent as PDU sequence numbers, in order to identify the PDU in question.

In LTE systems, RLC PDUs may be segmented, which has as a consequence that there will be two or more PDU segments with the same sequence number, since the sequence number is a property of the PDU. The process of segmenting PDUs is also denoted as re-segmentation.

Because of the re-segmentation in LTE, the sequence numbers will not suffice to identify the data for which ACK or NACK is sent.

SUMMARY

As has emerged from the explanation above, there is a need for a solution by means of which ACKs and NACKs which are transmitted by a receiving party to a sending party in 3G LTE systems can be identified, with respect to the data segments that they are sent in response to.

In addition, another need which should be addressed by the solution in question is that it should be possible to send a variable number of NACKs.

This need is addressed by the present invention in that it discloses a method for use in a cellular communications system, in which system traffic can be exchanged between a first and a second transceiver. The traffic in the system is sent in data units, each of which is given an identifier. The data units may be divided into segments, and a receiving transceiver may send status information in data frames or data units about properly received, partially received, or non-received data units to a sending transceiver, i.e. to the transceiver from which the data was sent.

According to the method of the invention, in the case of one or more partially or non-received data units, the status information which is sent to the sending transceiver includes information about whether the data units were non-received or partially received, and in the case of a partially received data unit, which parts of the data units that were not received.

Thus, by means of the invention, it becomes possible for the receiving transceiver to distinctly identify non-received parts of data units to the sending transceiver, thus in turn enabling the sending transceiver to retransmit those parts.

Also, the invention makes it possible to identify more or less any amount of non-received data, which was another of the needs to be addressed by the invention.

In one embodiment of the invention, the information about whether or not a data unit was non-received or partially received is included as a flag in said data frames or data units.

In another embodiment, the information about which parts of a data unit that were non-received is included in the data frames or data units as information which indicates a first and a last part of the non-received data.

In yet another aspect of the present invention, in the case that a data frame or unit from the sending transceiver has been segmented and one or more last segments has not reached the receiving transceiver, this can be indicated by the receiving transceiver.

In a further embodiment of the invention, the information about which parts of a data unit that were non-received is included in the data frames or data units as information which indicates the identifier of the data unit, as well as information about the beginning of the non-received data in said data unit, and the amount of non-received data.

These and other aspects and advantages of the present invention will be explained in more detail in the detailed explanation given below.

The invention also discloses a transceiver for use in a system of the invention.

BRIEF DESCRIPTION OF THE DRAWINGS

The invention will be described in more detail in the following, with reference to the appended drawings, in which FIGS. 2-6 show various embodiments of the invention.

DETAILED DESCRIPTION

Figure 1:
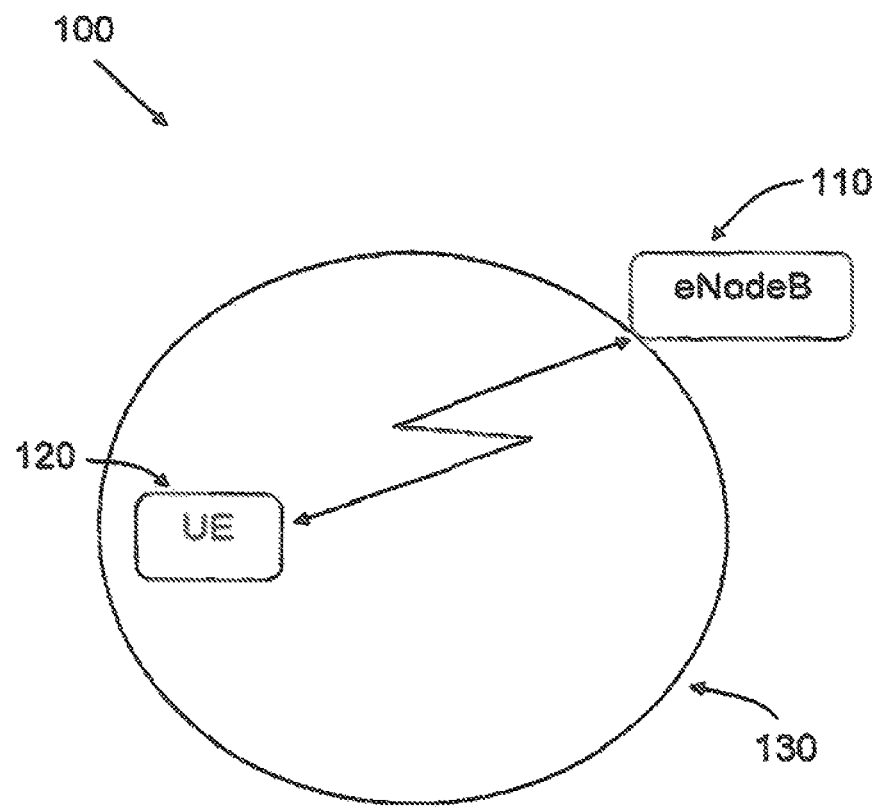
FIG. 1 shows a schematic view of a system in which the invention may be applied.

FIG. 1 shows a schematic view of a system 100 in which the invention may be applied. As mentioned previously, the invention is mainly intended for systems of the 3GPP LTE kind, i.e. Third Generation Partnership Project, Long Term Evolution systems, sometimes also referred to merely as LTE systems, but officially in 3GPP known as evolved UTRAN or E-UTRAN. These names will be used interchangeably throughout this description.

As shown in FIG. 1, an LTE system 100 can comprise a number of so called cells, one of which is shown as 130 in FIG. 1. Each cell in an LTE system can accommodate a number of users, sometimes generically referred to as UEs, User Equipments. In FIG. 1, one UE is symbolically shown, with the reference number 120.

LTE systems such as the one 100 in FIG. 1 will also comprise a so called "eNodeB", evolved NodeB, for each cell. One of the functions of the eNodeB of a cell is to control the traffic to and from users in a cell. In FIG. 1, an eNodeB 110 is shown as the eNodeB for the cell 130.

Traffic from the eNodeB to an UE is referred to as down link traffic, or simply DL traffic, and traffic from the UEs to the eNodeB is known as up link traffic, or simply UL traffic.

In LTE systems, an RLC protocol, Radio Link Control, is used for communication between the eNodeB and the UEs in a cell.

According to RLC, in LTE systems, traffic between two transceivers, i.e. an UE and its eNodeB is sent in so called PDUs, Protocol Data Units. According to RLC, each PDU is assigned an identifier, a so called sequence number, which allows both the sending and the receiving party to identify a PDU.

In the description below, it will be assumed that data PDUs are sent by the eNodeB, i.e. in DL, and that status PDUs are sent by an UE, i.e. in UL. However, it should be pointed out that this is merely an example intended to facilitate the reader's understanding of the invention, the invention can equally well be applied in the other direction, i.e. Data PDUs in UL and Status PDUs in DL. It can be mentioned here that E-UTRAN RLC can operate in different modes, configured by the eNodeB, namely Acknowledged Mode (AM), Unacknowledged Mode (UM) and transparent mode (TM). The status PDUs are at present only used in AM.

If the eNodeB 110 sends a PDU which contains data to the UE 120, i.e. a so called data PDU, the UE can reply with a so called status PDU, i.e. a PDU which indicates to the eNodeB the reception status of the data in the data PDU which was sent from the eNodeB.

In the status PDU to the eNodeB, data units which are correctly received by the UE is acknowledged by the UE by means of so called ACK messages or indicators, and data units which are erroneously received, i.e. only received in part, or not received at all are indicated by the UE by means of a so called negative ACK, a NACK. If the eNodeB from which the data originated receives a NACK in return for transmitted data, the eNodeB will thus know that this information should be retransmitted, usually until an ACK is received. In the case of DL data traffic, a UE will thus send status PDUs with ACKs and/or NACKs to the eNodeB in response to data PDUs from the eNodeB.

The ACKs provide information about up to which sequence number PDUs have been correctly received. This can be done either by providing the highest number of a successfully received PDU, or the first number of a non-received PDU.

In E-UTRAN RLC, data PDUs can be re-segmented, i.e. the payload of a previously created RLC PDU can, at the time of retransmission, be split into segments that are sent separately.

In LTE, it is intended that RLC PDU segments should be identified by means of the sequence number of the original RLC PDU, as well as a so called segmentation offset, SO, which indicates the segments' start in the original RLC PDU. An ACK or a NACK is sent in the form of the sequence number of the original RLC PDU, but since re-segmentation can occur, the segments which the ACK or NACK from the UE refers to cannot be identified uniquely in the eNodeB by means of the sequence number, and not even by means of the SO, due to the fact the segmentation can occur in several "generations", i.e. multiple re-segmentations can occur, and the eNodeB does not know which generation that the ACK/NACKs refer to.

It is this problem, i.e. identification of ACK/NACK:ed RLC PDU data that the invention intends to address.

Different cases can be discerned when it comes to status PDUs:
  a. A status PDU with only one ACK, and no NACKs.
  b. A status PDU with one ACK and one or more NACKS, which has two sub-cases:
    i. One or more of the NACKs are "segment NACKs".
    ii. All of the NACKS are non-segment NACKs.

Figure 2:
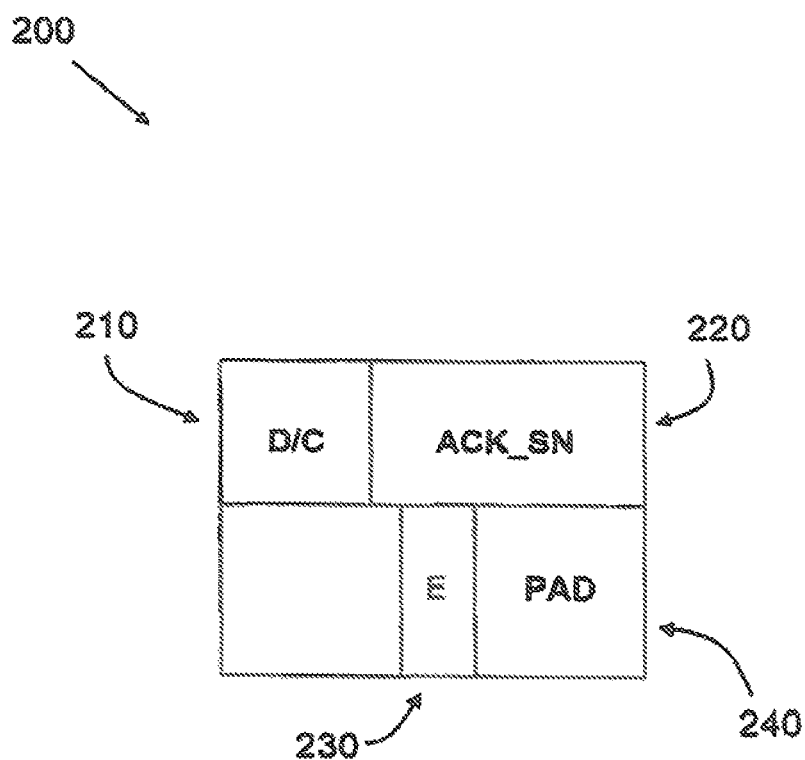

In order to address case "a" above, the invention proposes a status PDU which is shown in FIG. 2 with the reference number 200. As shown in FIG. 2, the status PDU 200 comprises a D/C-field 210, which indicates if the PDU 200 is a data or a control PDU. As will be understood, a status PDU is a control PDU.

In addition, the status PDU 200 includes an ACK field 220, with the ACK being provided in the form of the sequence number, SN, of the RLC PDU which the ACK refers to. The status PDU 200 also comprises an indicator, e.g. a flag or bit, shown in FIG. 2 as an "E-bit" 230, which is used to indicate the presence or absence of NACKs in the status PDU 200.

In the case of absence of NACKs in the status PDU, i.e. the case shown in FIG. 2, so called "padding" or "dummy bits" can be used in order to achieve proper alignment of the contents of the status PDU 200. One example of such alignment is so called "octet alignment", i.e. alignment which is used if the status PDU is divided into data octets. The padding is shown as 240 in FIG. 2.

Turning now to the case identified as "b-i" above, i.e. where one or more of the NACKs refer to segmented data units, in other words the case in which the NACKs indicate that a data unit has been partially received, a concept used by the invention will now be introduced. This concept is here referred to as "Segment Offset pairs" or "SO pairs", i.e. a data pair, one of which is used to indicate the first non-received data octet of the PDU which the NACK refers to, and the other of which is used to indicate the last non-received data octet which the NACK refers to. It can be added here that although octets are used to exemplify the invention since octets are used in LTE RLC, the invention can naturally be used if data is sent in other sizes as well.

An example of a Status PDU format 300 which can handle case "b-i" above is shown in FIG. 3. In similarity to the Status PDU format 200 of FIG. 2, the Status PDU format 300 comprises a field which indicates if the PDU 300 is a data or a control PDU, and an ACK field with the ACK being provided in the form of the sequence number, SN, of the RLC PDU which the ACK refers to. The status PDU 300 also comprises an indicator, e.g. a flag or bit, shown in FIG. 3 as an "E-bit", which is used to indicate the presence or absence of NACKs in the status PDU 300.

If one or more NACKs is included, as in FIG. 3, each NACK is followed by an "E" bit or flag and an "F" bit or flag, where the E bit/flag indicates if another NACK is present or not, and the F bit/flag indicates if an SO pair is included for the particular NACK or not. In other words, the F bit/flag can be said to indicate if the data unit to which the NACK refers was segmented or not, since that is the only case when SO pairs are used.

It can also be mentioned that the case of (for example) two missing but non-consecutive parts of one and the same PDU can be handled by the present invention in that one and the same NACK SN will occur twice, but with different SO pairs.

In similarity to the embodiment of FIG. 2, the ACKs and NACKs of the status PDU 300 of FIG. 3 are provided in the form of the sequence number, SN, of the RLC PDU which the ACK or NACK refers to, for which reason the ACK/NACKs are shown as ACK_SN or NACK_SN.

After the last NACK of the status PDU 300 in FIG. 3, the SO pairs are included for the NACKs for which the "F" flags/bits were set. Thus, the SO pair shown as SO11 and SO12 "belong" to NACK1_SN, and the SO pair shown as SO21 and SO22 "belong" to NACK2_SN. Also, as shown in FIG. 3, "padding", PAD, may be used in the status PDU 300 of FIG. 3, in order to obtain octet alignment or some similar purpose.

Returning now to the information comprised in the SO pairs, the first SO in an SO pair indicates the first missing data octet of the PDU, and the last SO in a pair indicates the last missing data octet in the PDU It should be pointed out that if the data in the received PDUs, i.e. the PDUs to which the ACK/NACKs refer, is arranged in groups other than octets, the invention can of course also be applied to such systems. The SO pairs would then in a way similar to that described above indicate the beginning and the end of the data in the PDU to which the NACK refers.

It can also be added that the status PDUs of the invention can also be expanded by means of a field, for example after the D/C-field, which indicates the nature of the status PDU, for example if RLC control PDUs other than STATUS PDUs are used. This field is included in the example shown in FIG. 3, indicated as "PDU type". The same principle, i.e. PDU type, may be applied in the version shown in FIG. 2.

With continued reference to the status PDUs of the invention, it should also be pointed out that the order of the data fields in the status PDUs shown in FIGS. 2 and 3 are merely examples of suitable embodiments, the data fields in the status PDU of the invention can be moved to other positions in the status PDU without affecting the functionality of the invention, for example in order to achieve octet alignment. As an example, in the case with only an ACK and no NACKs, i.e. the embodiment shown in FIG. 2, the status PDU 200 could start with a D/C field followed by an E bit, followed by padding and lastly the ACK with its sequence number.

Turning now to the case shown as b-ii above, i.e. one or more NACKs refer to non-received data PDUs, as opposed to partially received data units, this is handled in the following manner: the F flag corresponding to those NACKs indicates that no SO pairs are included in the status PDU for those NACKs.

A special case which is also addressed by the invention is when the last PDU segment of an RLC PDU has not been received by the UE (still assuming the case of data PDUS in DL). Assume an example where an RLC PDU with sequence number 10 has been segmented into 3 RLC PDUs, with the PDU segments containing octets 1-10, 11-25 and 26-40, respectively.

Consider now the case in which the UE has received the first two segments of RLC PDU 10, i.e. octets 1-10 and 11-25, and has also received the following RLC PDU, i.e. RLC PDU 11, in its entirety, but the UE has not received the last segment of RLC PDU 10, i.e. octets 26-40.

In this case, the UE knows that an RLC segment has been lost, but does not know its length, so the UE cannot set the second segmentation offset value in the corresponding SO pair in the status PDU. A solution to this which is proposed by the invention is to let a special value of an SO indicate that the end of the NACK:ed segment is not known. Thus, when the eNodeB receives a NACK for RLC PDU 10, a first SO is set to 26 and the corresponding second SO is set to the special value which tells the eNodeB that all data octets from 26 and forward for RLC PDU 10 need to be retransmitted.

In some cases, an SO pair is not always necessary to obtain the desired effect. As will be shown in the following, by using two bits in the "F" field, a complete identification of the non-received data may be achieved.

This is shown in the example of FIG. 4, in which all four combinations of two bits in the F field are illustrated, i.e. 00, 01, 10 and 11. The meanings of each of these combinations are also indicated in FIG. 4, as follows:

F field Meaning
00 The NACK refers to the entire RLC PDU, so no SOs are necessary.
01 The NACK refers to a first part of the RLC PDU, 1 SO is needed in order to indicate the last non-received data group, such as, for example, an octet.
10 The NACK refers to a last part of the RLC PDU, 1 SO is needed in order to indicate the first non-received data group, such as, for example, an octet.
11 The NACK refers to a middle part of the RLC PDU, 2 SOs are needed in order to indicate the first and the last non-received data group, such as, for example, an octet.

It should be pointed out that in the case shown in FIG. 4, in similarity to the embodiments shown previously, a "type field" may be needed in order to separate status RLC PDUs from other RLC control PDUs.

Figure 5:
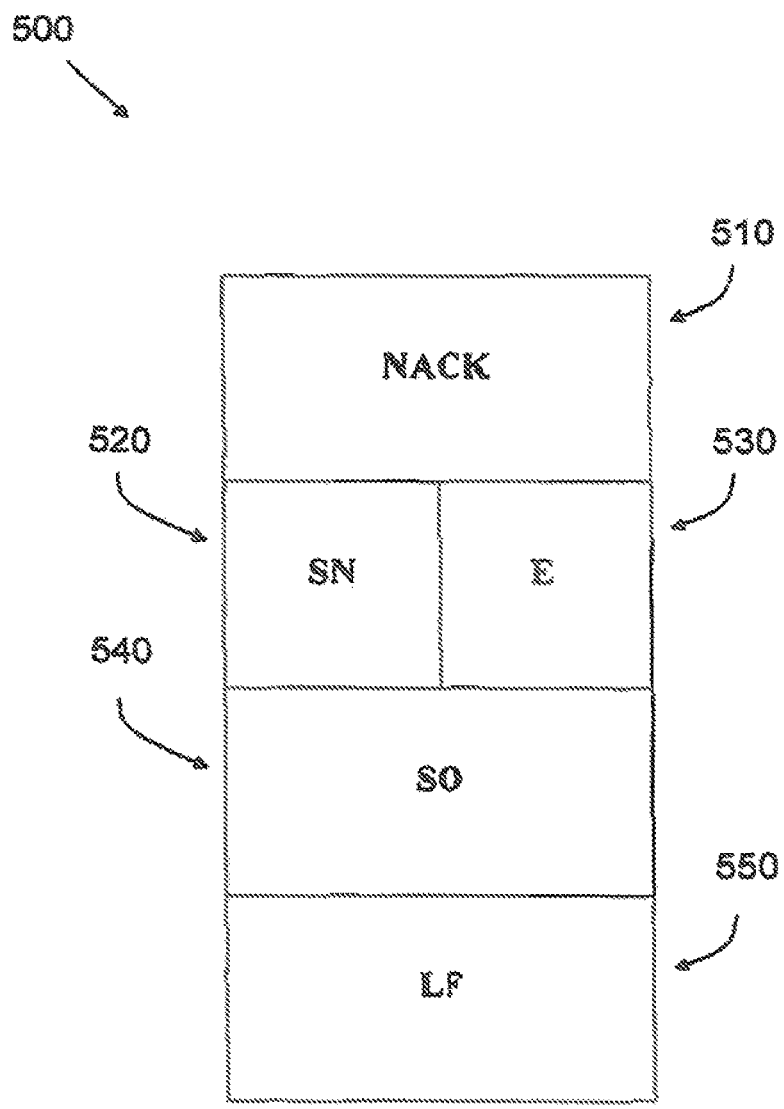

In another embodiment of the present invention, partially received DL RLC data PDUs are indicated to the eNodeB by the UE in an UL status RLC PDU in a slightly different manner than that shown above, i.e. the SO pairs. In the embodiment in question, the status RLC PDU 500 of which is shown in FIG. 5, the UL status RLC PDU from the UE comprises a NACK field, shown as 510, and a sequence number field, SN, shown as 520, which indicates the sequence number of the DL RLC data PDU which the NACK refers to. Naturally, in the embodiment 500, the SN can also be included together with the NACK, as shown in previous embodiments.

In similarity to the previous embodiments, the embodiment 500 also includes the use of an "E" field, shown as 530 in FIG. 5. However, the significance of the E-field, i.e. a bit or a flag, differs slightly from that of the previous embodiments: in the embodiment 500 of FIG. 5, the E-field is used to signify if the NACK 510 refers to an entire RLC data PDU or to data within an RLC data PDU. For example, if the E-field equals zero, E=0, this could signify that the NACK 510 refers to the entire RLC data PDU which is identified by the SN 520.

Conversely, if E=0 signifies an entire PDU, then E=1 signifies that the NACK 510 refers to data within the PDU identified by the SN 520. In this case, information is included in the status PDU 500 in order for the eNodeB to be able to identify the data in question. This information regarding data in the embodiment 500 comprises a segment offset value, SO, shown as 540 in FIG. 5. The SO 540 indicates the byte offset or the start of the non-received DL data. However, as opposed to the previous embodiments, the embodiment 500 does not use SO pairs to indicate the totality of the non-received data. Instead, the embodiment 500 utilizes a Length Field, LF, 550, the value of which indicates the beginning of the non-received data, starting from the SO value 540, up to the last byte of the non-received data.

As can be realized, in this embodiment of the invention, i.e. the one shown in FIG. 5, in order to achieve efficient retransmission from the original sender of the data, the exact number of bytes that should be retransmitted needs to be indicated to the sender. Since LTE RLC PDUs can be quite large (e.g. 32767 bytes), the fields (i.e. SO and LF) needed for indication of the RLC PDU segments would need to be quite large as well. However, as will also be realized, in many cases the maximum theoretical size of the SO and LF fields will not need to be utilized, which would thus lead to a waste of data space if the size of those fields were made static.

In one embodiment of the present invention, the inventors propose to alleviate this problem, i.e. inefficient use of data space for the SO and LF fields. This embodiment will be described in the following.

In this aspect of the invention, a basic principle is that the SO and LF field sizes in the RLC status PDU are made adaptive to the needs of the current RLC status PDU. Obviously, it is possible to use two different sizes for SO and LF, e.g. 6 bits for RSO and 4 bits for RSL. However, in the subsequent description, it will be assumed that the size is the same.

If, as proposed in this aspect of the present invention, a dynamic length field for SO and LF are used, the eNodeB (in the case of data in DL and status messages in UL) must know this length field size in order to be able to read the status message.

A first way of accomplishing this is to have an additional field in the RLC status PDU message header which is indicative of the size of the SO and LF fields. For example, there could be a field which indicates that all length fields in the current message are 6 bits. This size could differ from RLC PDU status message to status message.

If SO and LF were to be given different size values, two such length fields would be needed, or use could be made of a predefined relationship between them, e.g. SO is always x bits longer/shorter than LF. However, since SO and LF are typically of the same order, this optimization might not be required.

According to an alternative aspect of the invention, the explicit indication of the size of the SO and LF fields is superfluous, due to a re-arrangement in the RLC PDU status message. In this aspect of the invention, it is proposed to move the "length fields" SO and LF to the end of the RLC PDU status message, which will be described with reference to FIG. 6.

Figure 6:
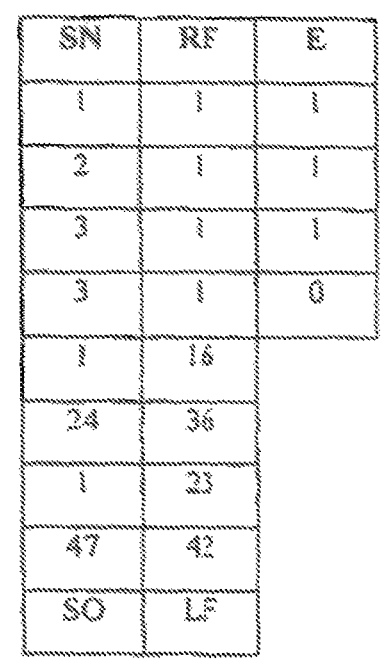

In the embodiment shown in FIG. 6, the status information for all included PDUs is provided first, i.e. SN (segment number), RF (Resegmentation Flag) and an extension bit, "E". In this way it will be possible to also include complete PDUs, where no specific segment information needs to be sent. For PDUs where resegmentation has occurred, the RF is used to indicate that segment location and length information follows, and SO and LF are appended to the message frame Thus, in the embodiment of FIG. 6, the "dynamic" part of the status message, i.e. SO and LF, occurs after the last extension bit E, i.e. after the first E bit with a value which indicates that it is the last one, such as for example the value "0". Since the overall message size in this embodiment needs to be known, for example from a MAC or RLC header, the receiver knows how many bits are left for the SO and LF fields. It also knows how many SO and LF pairs that will follow after the last extension bit. Thus, the receiver can calculate the sizes of the SO and LF fields.

If it is a requirement that the RLC status PDU should be byte-aligned, an additional step has to be carried out, in that the number of remaining bits is also divided by the number of indicated segment fields. The integer result is used as length, while the remaining bits are not used. As an example, if the remaining length is 51 bits, and byte alignment (8 bits) is used, we get the calculation 51/8=6 mod 3. Thus, in this example, 3 bits at the end of the status PDU will not be used.

In the example above, the LF is used to determine the end of an RLC PDU segment. However, it is would be possible within the scope of the present invention to use an absolute offset, in similarity to the SO. In such a case, the offset would point to the original position of the last byte in the RLC PDU segment.

The status message content might describe the data that is ACK:ed or NACK:ed. Also, a mixture of ACKs and NACKs could be included, with one or more additional bit(s) to provide a suitable ACK/NACK indicator.

The described status message of FIG. 6 should merely be seen as an example, additional fields like type flags to indicate whether the PDU contains data or a status, additional length fields and so on might be required in some applications, and would be within the scope of this invention.

Explicit status information may also be added to the status reports, especially in case the standard or implementation allows multiple types of states to be reported, e.g. NACK and ACK.

An explicit indication of a status may also be necessary if the LTE system is configured to exchange a status report of a single type, e.g. only NACKs. Alternatively, the status report sending entity may receive from the PDU sending entity a request for a status report of a certain type (e.g. NACK only) and would thus generate the status report only for the subset of received segments that have been not been received.

In a further aspect of the invention, it could be envisioned to send the RLC PDU status message as a separate PDU, or piggybacked with another PDU.

Figure 7:
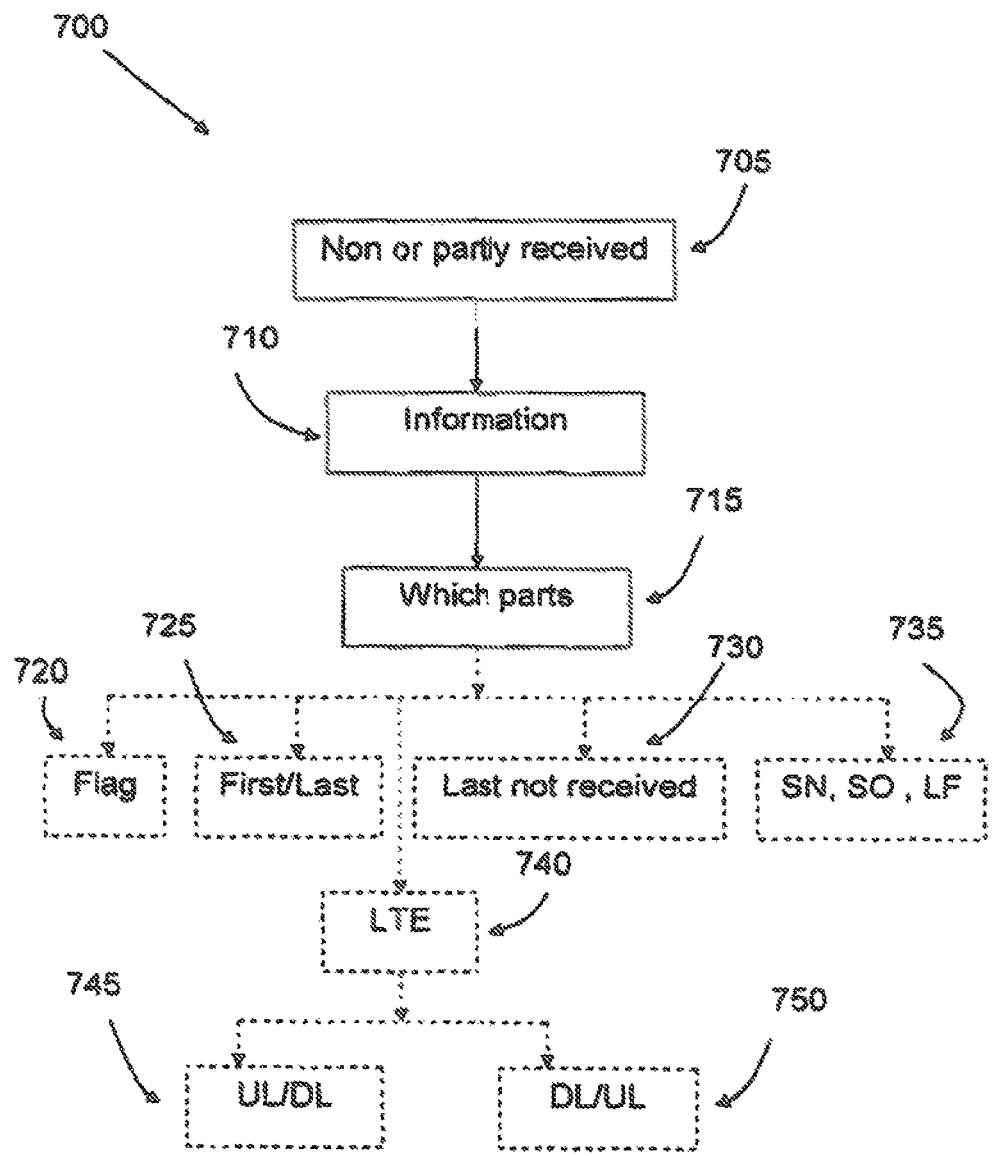
FIG. 7 shows a schematic flow chart of a method of the invention.

FIG. 7 shows a rough flow chart of a method 700 of the invention. Steps which are options or alternatives are shown with dashed lines.

As has been indicated in the description above, the method of the invention is intended for use in a cellular communications system such as the one 100 of FIG. 1, i.e. a system in which traffic can be exchanged between a first and a second transceiver such as the UE 120 and the eNodeB 120.

The traffic in the system 100 is sent in data units, and each of these data units is given an identifier. The data units may be divided into segments, and a receiving transceiver may send status information in data frames or data units about properly received, partially received or non-received data units to the sending transceiver, i.e. to the transceiver from which the data was sent.

According to the inventive method 700, as indicated in step 705, in the case of one or more partially or non-received data unit or units, the status information which is sent to the sending transceiver includes, as shown in step 710, information about whether data unit or units were non-received or partially received, and if so, as shown in step 715, in the case of one or more partially received data units, which parts of those data units that were not received.

In one embodiment of the invention, as shown in step 720, the information the information about whether or not a data unit was partially or non-received is included as a flag in said data frames or data units.

As indicated in step 725, in a further embodiment of the invention, the information about which parts of a data unit that were not received is included in said data frames or data units as information which indicates a first and a last part of the not received data unit.

Step 730 indicates that in one aspect of the invention, if a data frame or unit from the sending transceiver has been segmented or re-segmented, and a last segment has not reached the receiving transceiver, this can be indicated by the receiving transceiver to the sending transceiver, suitably by means of a special predefined value for the information about the last part of the non-received received segments.

Step 735 indicates that in one embodiment of the invention, if a data frame or unit from the sending transceiver has been segmented and a last segment has not reached the receiving transceiver, this can be indicated by the receiving transceiver to the sending transceiver As has been indicated previously in this description, and as shown in step 740, the method 700 of the invention may suitably be applied to an LTE, Long Term Evolution, system such as the one 100 which is schematically shown in FIG. 1.

If the inventive method 700 is applied to an LTE system, the data PDUs may be sent in DL and the corresponding status PDUs will then be sent in UL, as indicated in step 750, in which case the "sending transceiver" mentioned above is the eNodeB of an LTE cell, and the "receiving transceiver" is a UE User Equipment, of the LTE cell.

Conversely, the invention may equally well be applied so that the data PDUs may be sent in UL and the corresponding status PDUs will then be sent in DL, as indicated in step 745, in which case the "sending transceiver" mentioned above is the UE of an LTE cell, and the receiving transceiver is the eNodeB of the LTE cell.

With reference to the status PDU 300 shown in FIG. 3, it can be pointed out that the information from the receiving transceiver to the sending transceiver can be sent as a message which has the possibility of comprising one or more of the following:

Information (D/C) about the nature of the message, e.g. data or control message, Information (PDU type) about the type of message within said nature, e.g. a status message in the case of control message, Data (ACK) acknowledging properly received data units or frames in the form of a certain sequence number, A first extension indicator (E), Data (NACK) regarding an non- or partially received data unit or frame in the form of a certain sequence number (SN) of said data unit or frame, A second extension indicator (F), Information about the beginning (SO11, SO21) and end (SO12, SO22) of non-received data.

In the exemplary status PDU shown in FIG. 3, the first extension indicator, E, indicates the absence or presence of a set comprising another of the first, and second extension indicators, i.e. E and F, and data, NACK, regarding a partially or non-received data unit or frame, in the form of the identifier, SN, of the data unit or frame. The second extension indicator, F, indicates the absence or presence of information about the beginning, SO11, SO21, and end, SO21, SO22, of non-received data.

The invention also discloses a transceiver for use in a system in which the invention is applied. As has emerged from the description above, the invention can be applied either when data PDUs are sent in DL and the corresponding status PDUs are sent in UL, in which case the data sending transceiver (in the case of E-UTRAN applications) is the eNodeB and the receiving transceiver, i.e. the transceiver which transmits status PDUs is the UE, or conversely, when data PDUs are sent in UL and the corresponding status PDUs are sent in DL, in which case the data sending transceiver is the UE and the receiving transceiver, i.e. the transceiver which transmits status PDUs is the eNodeB. Thus, the transceiver of the invention may be either an E-UTRAN eNodeB or an E-UTRAN UE.

Figure 8:
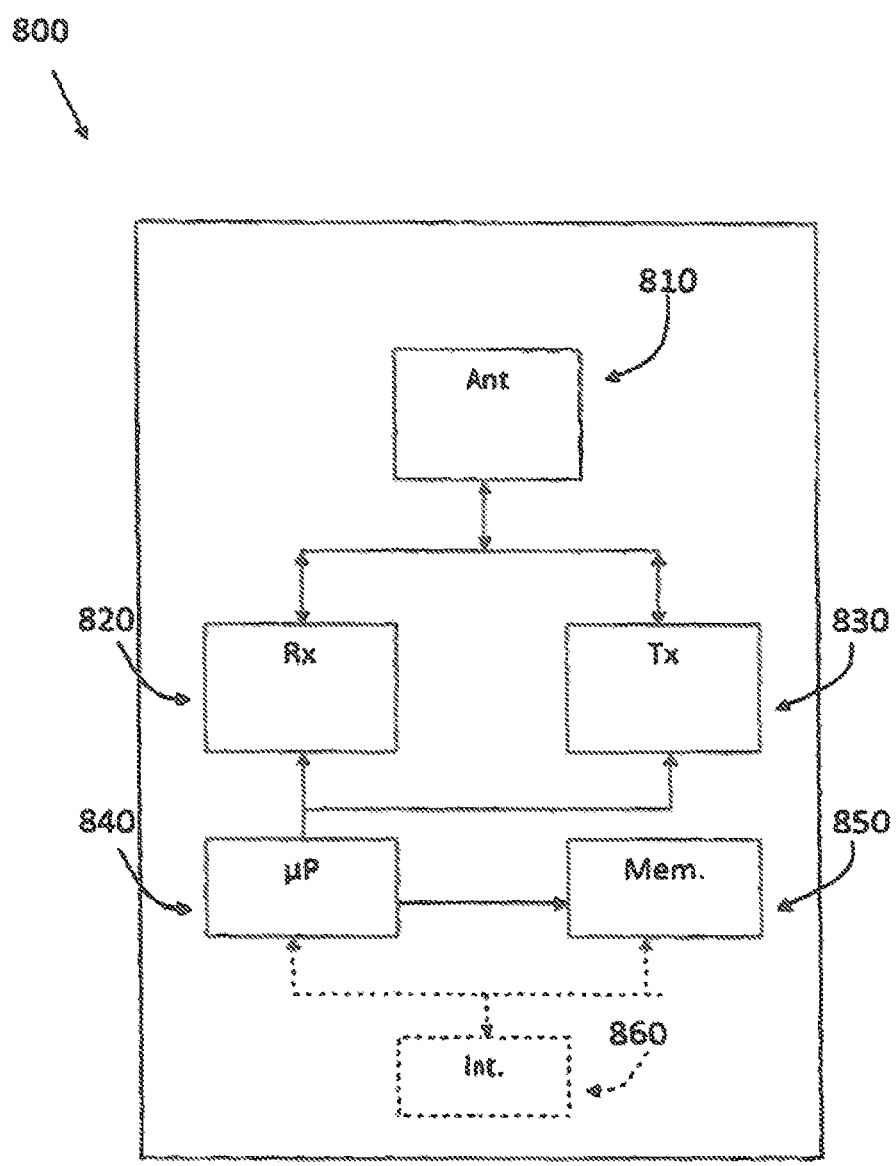
FIG. 8 shows a block diagram of a transceiver of the invention.

A schematic block diagram of a generic inventive transceiver 800 for use as an E-UTRAN eNodeB or an E-UTRAN UE is shown in FIG. 8. As indicated in FIG. 8, the transceiver 800 will comprise an antenna, shown as block 810, and will also comprise a receive part 820 and a transmit part 830. In addition, the transceiver 800 also comprises a control means 840 such as a micro processor, as well as a memory 850. Furthermore, if the transceiver 800 is to be used as an eNodeB, the transceiver 800 also comprises an interface 860 towards other components in the system apart from the UEs. Since the interface may not be present if the transceiver 800 is a UE, the interface 860 is shown with dashed lines.

The transceiver 800 can use the antenna 810, the receive part 820 and the transmit part 830 for sending traffic to and receiving traffic from a second transceiver in the system, and the transceiver 800 may use the control means 840 together with the memory 850 for sending said traffic in data units.

The control means 840 and the memory 850 may also be used for giving each of the data units an identifier, such as for example a sequence number, and the same means, i.e. blocks 840 and 850 may be used for dividing the data units into segments.

The inventive transceiver 800 also uses the control means 840, the memory 850, the transmitter 830 and the antenna 810 for sending information in data frames or data units about properly received, partially received or non-received data units to the second transceiver, i.e. to the transceiver from which the data was sent.

In addition, the transceiver 800 can use the control means 840 and the memory 850 for, in the case of one or more non-received or partially received data units, including information in the status information about whether the data unit or units were non-received or partially received, and in the case of one or more partially received data units, which parts of those data units that that were non-received.

In one embodiment, the means 840 and 850 are used by the transceiver 800 for including the information about whether or not a data unit was partially or non-received as a flag in said data frames or data units.

In addition, in a further embodiment, blocks 840 and 850 are used by the transceiver for including the information about which parts of a data unit that were non-received in said data frames or data units as information which indicates a first and a last part of the non-received data unit.

In another aspect of the invention, the control means 840, the memory 850, the transmitter 830, together with the antenna 810 can be used by the transceiver 800 for indicating to a sending transceiver if a data frame or unit from the sending transceiver has been segmented, and a last segment has not reached the transceiver 800.

The indication about a missing segment is suitably carried out by means of using a special predefined value for the information about the last part of the missing segment.

In one embodiment, the control means 840 and the memory 850 can be used by the transceiver 800 for including the information about which parts of a partially received data unit that were not received in said data frames or data units as information which indicates the identifier of the data unit, as well as information about the beginning of the non-received data in said data unit, and the amount of non-received data.

In addition, the antenna 810, the transmitter 830, the control means 840 and the memory 850 can be used by the inventive transceiver for sending status information to a sending transceiver as a message, such as the one 300 of FIG. 3, which can comprise one or more of the following:

Information (D/C) about the nature of the message, e.g. data or control message, Information about the type of message within said nature, e.g. a status message in the case of a control message, Data (ACK) acknowledging properly received data units or frames in the form of a certain sequence number, A first extension indicator (E), Data (NACK) regarding a non-received or partially received data unit or frame, in the form of a certain sequence number, A second extension indicator (F), Information about the beginning (SO11, SO21) and end (SO12, SO22) of non-received data.

Suitably, the first extension indicator (E) indicates the absence or presence of a set comprising another of said first (E) and second (F) extension indicators and data (NACK) regarding an partially or non-received unit or frame in the form of the identifier (SN) of said data unit or frame, and said second extension indicator (F) indicates the absence or presence of information about the beginning (SO11, SO21) and end (SO12, SO22) of non-received data.

The invention is not limited to the examples of embodiments described above and shown in the drawings, but may be freely varied within the scope of the appended claims.

The invention claimed is:

1. A method for use in a cellular communications system comprising:
receiving, at a receiving transceiver, data units from a sending transceiver, wherein the data units are each identified by an identifier and wherein the data units are divided into segments;
sending status information from the receiving transceiver to the sending transceiver, about properly received, partially received, or non-received data units; and
wherein sending said status information comprises sending a message comprising:
data acknowledging properly received data units or frames in the form of a certain sequence number;
an extension indicator (E) of a first type;
data regarding a non-received or partially received data unit or frame, in the form of a certain sequence number;
an extension indicator (F) of a second type, indicating whether the data unit or units were non-received or partially received; and, in the case of one or more partially received data units, which parts of those data units were not received,
and further wherein said extension indicator of the first type indicates the absence or presence of a set comprising another extension indicator of the first type and another extension indicator of the second-type and data regarding a non-received or partially received data unit or frame in the form of the identifier of said data unit or frame.

2. The method of claim 1, according to which the information about whether or not a data unit was partially or non-received is included as a flag in said data frames or data units.

3. The method of claim 1, according to which the information about which parts of a data unit that were not received is included in said data frames or data units as information which indicates a first and a last part of the non-received data unit.

4. The method of claim 1, according to which, if a data frame or unit from the sending transceiver has been segmented and a last segment has not reached the receiving transceiver, this can be indicated by the receiving transceiver to the sending transceiver.

5. The method of claim 4, according to which said indication about a missing segment is carried out by means of a special predefined value for the information about the last part of the missing segment.

6. The method of claim 1, according to which the information about which parts of a partially received data unit that were not received is included in said data frames or data units as information which indicates the identifier of the data unit, as well as information about the beginning of the non-received data in said data unit, and the amount of non-received data.

7. The method of claim 1, wherein the system comprises an E-UTRAN system.

8. The method of claim 7, wherein said data unit is an RLC POU, such that said segments are RLC PDU segments.

9. The method of claim 8, wherein the sending transceiver is an eNodeB of a E-UTRAN cell, and the receiving transceiver is a User Equipment (UE) of the E-UTRAN cell.

10. The method of claim 8, wherein the sending transceiver is a User Equipment (UE) of an E-UTRAN cell, and the receiving transceiver is an eNodeB of the E-UTRAN cell.

11. The method of claim 1, wherein the message comprises one or more of the following: information identifying the message as being a data or control message;
information identifying the message as a status type message, at least for control messages; and
information about the beginning and end of non-received data.

12. The method of claim 11, wherein said extension indicator of the second type indicates the absence or presence of information about the beginning and end of non-received data.

13. The method of claim 1, wherein the indicator of the first type is a bit.

14. The method of claim 1, wherein the indicator of the second type is a single bit.

15. The method of claim 1, wherein the indicator of the second type is two bits.

16. The method of claim 1, wherein the data acknowledging properly received data units or frames is not directly followed in the message by the data regarding a non-received or partially received data unit or frame.

17. A transceiver for use in a cellular communications system, said transceiver comprising:
means for receiving data units from a sending transceiver, wherein the data units are each identified by an identifier and wherein the data units are divided into segments;

means for sending status information about properly received, partially received or non-received data units to said second transceiver, including means for, in the case of one or more non-received or partially received data units, sending the status information as a message comprising:

data acknowledging properly received data units or frames in the form of a certain sequence number;

an extension indicator (E) of a first type;

data regarding a non-received or partially received data unit or frame, in the form of a certain sequence number;

an extension indicator (F) of a second type, indicating whether the data unit or units were non-received or partially received; and, in the case of one or more partially received data units, which parts of those data units that were non-received; and wherein said extension indicator of the first type indicates the absence or presence of a set comprising another extension indicator of the first type and another extension indicator of the second type and data regarding a partially or non-received unit or frame in the form of the identifier of said data unit or frame.

18. The transceiver of claim 17, including means for including the information about whether or not a data unit was partially or non-received as a flag in said data frames or data units.

19. The transceiver of claim 17, including means for including the information about which parts of a data unit that were non-received in said data frames or data units as information which indicates a first and a last part of the non-received data unit.

20. The transceiver of claim 17, including means for, if a data frame or unit from the sending transceiver has been segmented and a last segment has not reached the receiving transceiver, indicating this to the sending transceiver.

21. The transceiver of claim 20, in which said indication about a missing segment is carried out by means of using a special predefined value for the information about the last part of the missing segment.

22. The transceiver of claim 17, including means for including the information about information about which parts of a partially received data unit that were not received in said data frames or data units as information which indicates the identifier of the data unit, as well as information about the beginning of the non-received data in said data unit, and the amount of non-received data.

23. The transceiver of claim 17, wherein the transceiver is configured for operation in a E-UTRAN system.

24. The transceiver of claim 23, wherein said data unit is an RLC PDU, such that said segments are RLC PDU segments.

25. The transceiver of claim 23, wherein the transceiver comprises an eNodeB of the E-UTRAN system.

26. The transceiver of claim 23, wherein the transceiver comprises a User Equipment (UE) of the E-UTRAN system.

27. The transceiver of claim 17, including means for sending status information to a sending transceiver as a message comprising one or more of the following: information identifying the message as a data or control message; information identifying the message as a status type message, at least for control messages; and information about the beginning and end of non-received segments.

28. The transceiver of claim 27, wherein said extension indicator of the second type indicates the absence or presence of information about the beginning and end of non-received data.

29. The transceiver of claim 17, wherein the indicator of the first type is a bit.

30. The transceiver of claim 17, wherein the indicator of the second type is a single bit.

31. The transceiver of claim 17, wherein the indicator of the second type is two bits.

32. The transceiver of claim 17, wherein the data acknowledging properly received data units or frames is not directly followed in the message by the data regarding a non-received or partially received data unit or frame.

* * * * *

UNITED STATES PATENT AND TRADEMARK OFFICE
CERTIFICATE OF CORRECTION

PATENT NO. : 9,729,278 B2
APPLICATION NO. : 14/614159
DATED : August 8, 2017
INVENTOR(S) : Torsner et al.

It is certified that error appears in the above-identified patent and that said Letters Patent is hereby corrected as shown below:

On the Title Page

In Column 1, below Item (63), insert -- (30) Foreign Application Priority Data
Feb. 1, 2007 (EPO) .................. PCT/EP2007/050994 --.

In the Drawings

Fig. 1, Drawing Sheet 1 of 8, delete "Fig" and insert -- Fig. --, therefor at each occurrence throughout the figures.

Fig. 7, Drawing Sheet 7 of 8, for Step "705", in Line 1, delete "partly" and insert -- partially --, therefor.

In the Specification

Column 1, Line 8, delete "2011" and insert -- 2011, now Pat. No. 8,982,870, --, therefor.

Column 1, Line 10, delete "2009," and insert -- 2009, now Pat. No. 8,036,150, --, therefor.

Column 1, Line 41, delete "NACKS," and insert -- NACKs, --, therefor.

Column 1, Line 43, delete "information (NACK)" and insert -- non acknowledgement (NACK) --, therefor.

Column 1, Line 45, delete "NACKS" and insert -- NACKs --, therefor.

Column 3, Line 18, delete "up link" and insert -- uplink --, therefor.

Column 4, Line 17, delete "NACKS," and insert -- NACKs, --, therefor.

Signed and Sealed this
Fourteenth Day of August, 2018

Andrei Iancu
*Director of the United States Patent and Trademark Office*

CERTIFICATE OF CORRECTION (continued)
U.S. Pat. No. 9,729,278 B2

Column 4, Line 20, delete "NACKS" and insert -- NACKs --, therefor.

Column 5, Line 26, delete "PDU" and insert -- PDU. --, therefor.

Column 7, Line 28, delete "RSO" and insert -- SO --, therefor.

Column 7, Line 28, delete "RSL." and insert -- LF. --, therefor.

Column 7, Line 63, delete "frame" and insert -- frame. --, therefor.

Column 8, Lines 53-54, delete "eNodeB 120." and insert -- eNodeB 110. --, therefor.

Column 9, Line 19, delete "non-received received" and insert -- non-received --, therefor.

Column 9, Line 24, delete "transceiver" and insert -- transceiver. --, therefor.

In the Claims

Column 11, Line 63, Claim 1, delete "received," and insert -- received; --, therefor.

Column 11, Line 64, Claim 1, delete "and" and insert the same at Line 63, after "received,", as a continuation sub-point.

Column 12, Line 33, Claim 8, delete "RLC POU," and insert -- RLC PDU, --, therefor.

Column 12, Lines 42-43, Claim 11, delete "information.................message;" and insert the same at Line 43, as a new sub-point.

Column 14, Line 2, Claim 22, delete "information about information about" and insert -- information about --, therefor.